United States Patent [19]

Thomas

[11] Patent Number: 4,942,688

[45] Date of Patent: Jul. 24, 1990

[54] APPARATUS FOR TROTLINE FISHING

[76] Inventor: Mit Thomas, 2960 Phyllis La., Dallas, Tex. 75234

[21] Appl. No.: 311,035

[22] Filed: Feb. 15, 1989

[51] Int. Cl.⁵ .......................................... A01K 97/10
[52] U.S. Cl. ........................................ 43/27.2; 43/6.5
[58] Field of Search .................. 43/6.5, 27.2, 27.4, 43/4, 4.5

[56] References Cited

U.S. PATENT DOCUMENTS

| | | | |
|---|---|---|---|
| 2,414,055 | 1/1947 | Miller | 43/6.5 |
| 2,643,477 | 6/1953 | Silva | 43/6.5 |
| 3,626,627 | 12/1971 | Osborne | 43/27.4 |
| 3,654,721 | 4/1972 | Coleman | 43/27.4 |
| 3,831,311 | 8/1974 | Cushing | 43/6.5 |
| 3,910,524 | 10/1975 | Ireland | 43/6.5 |
| 4,184,280 | 1/1980 | Friend | 43/27.2 |
| 4,274,219 | 6/1981 | Way | 43/27.2 |
| 4,321,766 | 3/1982 | Henderson | 43/27.4 |
| 4,813,171 | 3/1989 | Cooper et al. | 43/27.4 |

Primary Examiner—M. Jordan
Attorney, Agent, or Firm—T. D. Copeland

[57] ABSTRACT

The invention is a structure that is particularly configured to support simultaneously a multitude of fishing lines, and a live bait trap. Attached to each line are several fishing hooks, and all or a portion of the several fishing hooks are specifically designed to secure live fishing bait without doing injurious harm to the live bait, and also all or a portion of the fishing lines may be attached to a tow line equipped with a turning block with multiple hooks, and said turning block features bright, illuminating devices that reflect underwater light in alternating patterns as the turning block rotates freely in a body of water with sufficient current velocity to cause the rotation of the turning block. That particular structure is secured to a landing pier or a boat in a pivotal manner such that the supported multiple lines, fishing hooks and, turning blocks can be conveniently raised from the body of water or lowered into the same body of water.

2 Claims, 4 Drawing Sheets

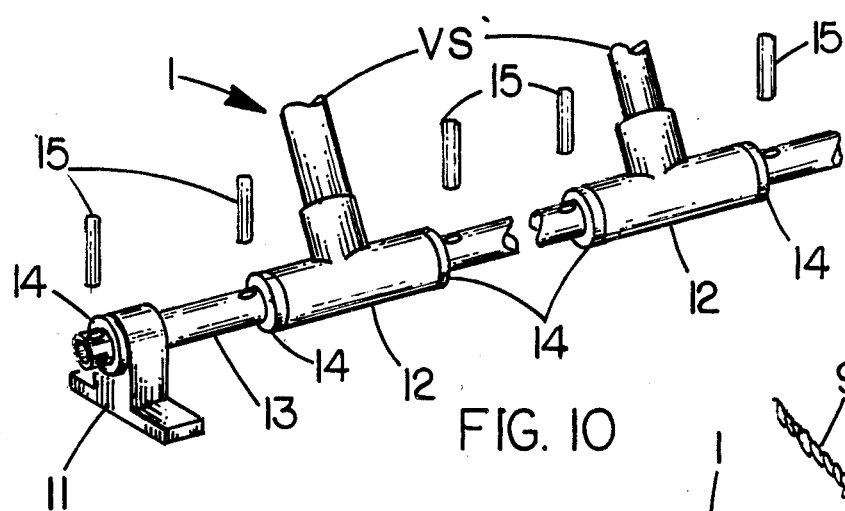
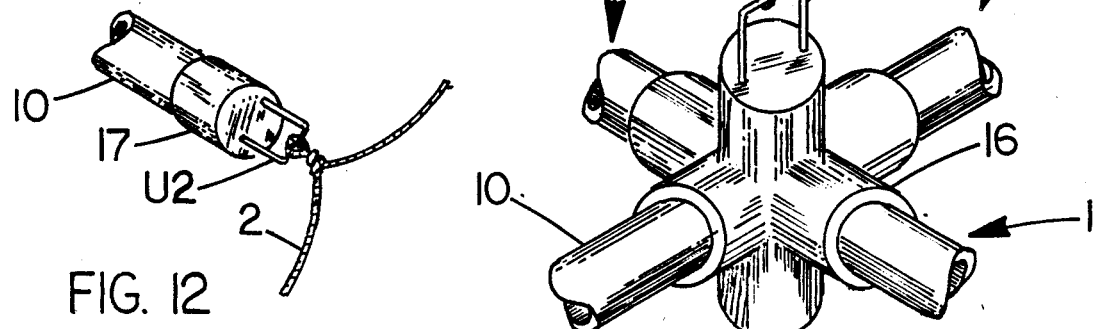
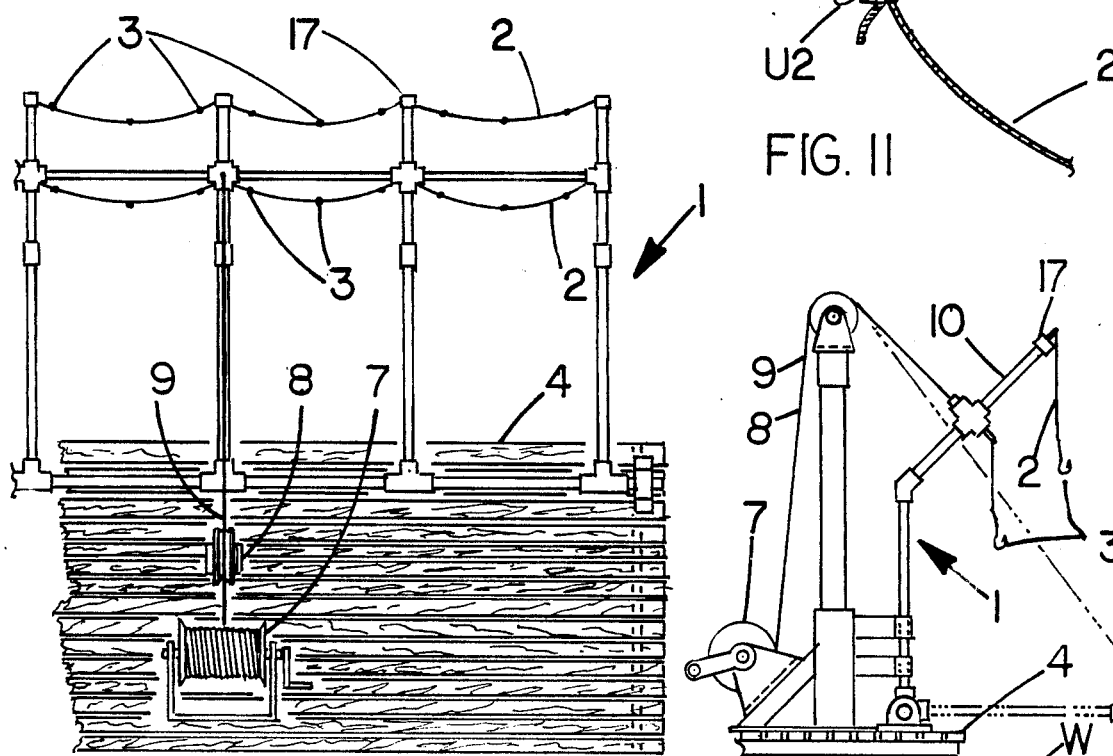
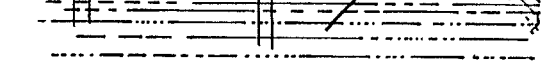

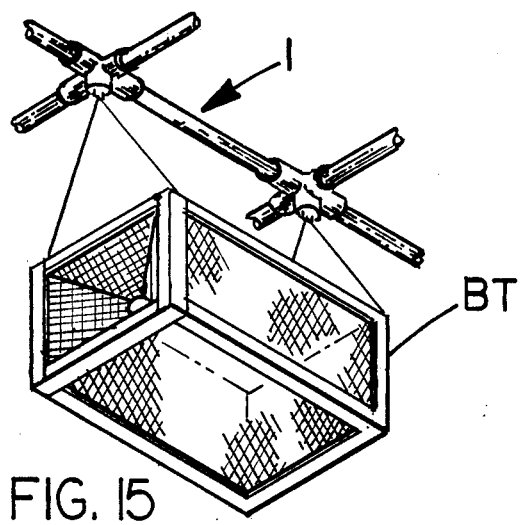
FIG. 15
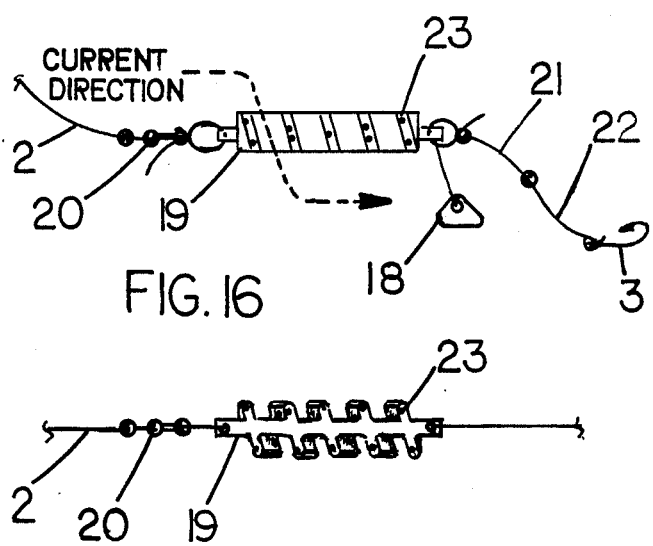
FIG. 16
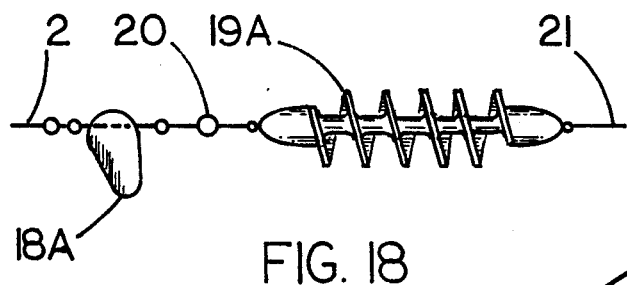
FIG. 17
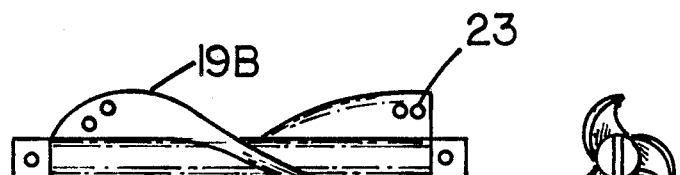
FIG. 18
FIG. 19
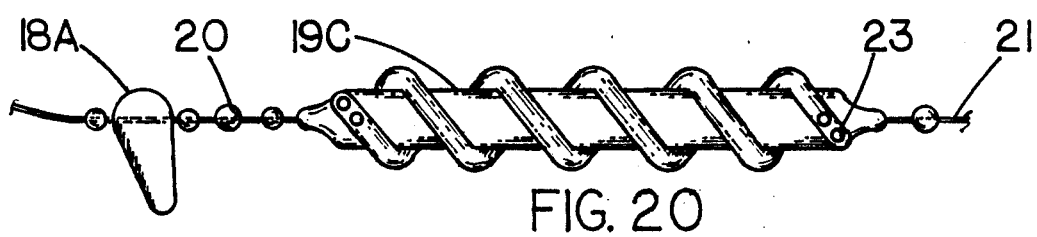
FIG. 20
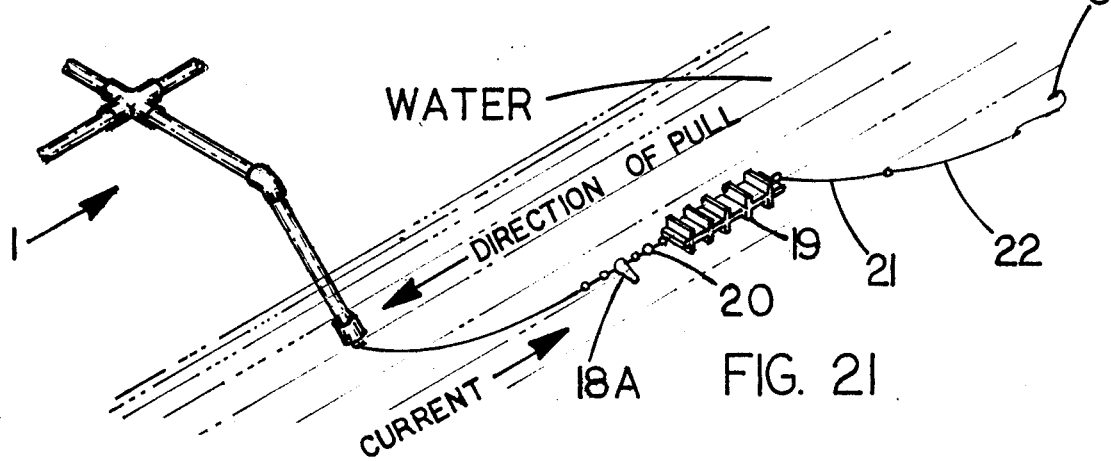
FIG. 21

APPARATUS FOR TROTLINE FISHING

BACKGROUND OF THE INVENTION

This invention pertains to the sport of fresh water fishing, as well as commercial gathering of fresh water game fish. The invention is comprised of a structure that is particularly configured to support simultaneously a multitude of fishing lines, and a live bait trap. Attached to each line are several fishing hooks, and all or a portion of the several fishing hooks are specifically designed to secure live fishing bait without doing injurious harm to the live bait, and also all or a portion of the fishing lines may be attached to a tow line equipped with a turning block with multiple hooks, and said turning block features bright, illuminating devices that reflect underwater light in alternating patterns as the turning block rotates freely in a body of water with sufficient current velocity to cause the rotation of the turning block. The particular structure is secured to a landing pier or a boat in a pivotal manner such that the support multiple lines, fishing hooks and, turning blocks can be conveniently raised from the body of water or lowered into the same body of water.

Prior trotline fishing has employed a single line of some desired length with a number of fishing hooks secured to the single line at intervals suitable to the type of fresh water fish that is desired to be captured. One end of the single line is attached to a rigid body that is anchored in the bank of the body of water, or is rigidly anchored into the bottom of the body of water, while the opposite end is secured some distance away, and is attached to a suitable anchor, or buoy, for the purpose of stabilizing the single line at a position below the surface of the body of water desired by the fisherman. Captured fish are harvested by traveling in a boat along the route of the submerged line, marked by buoys, and carefully lifting the submerged line with the attached fish hooks, above the surface of the water by hand and removing the impaled game fish; attaching fresh bait onto the fishing hooks, and then lowering the single line with its baited fishing hooks into the body of water. There are problems that occur when this type of trotline fishing is employed because these single lines are submerged and are usually not clearly marked at the surface of the water. Live stock have been impaled on the hooks when the single lines are placed near the bank of a body of water, entangled fishing lines, fouled boat propellers, personal safety for swimmers and others enjoying the facilities of fresh water sports in our public waterways are just a few of the other problems caused by these submerged single trotlines.

This invention solves these problems, or at least greatly minimizes the effects of these and other problems, because the boundaries of the fishing area are clearly marked by the geometry of the supporting structure to which the trotlines are attached. When this type of trotline fishing is employed on private bodies of water, it is with the knowledge of the owner and livestock can be relocated, or fencing devices installed to keep the livestock out of the region of water used for trotline fishing. When this invention is used in our public waterways it is clearly visible and thus people will know of its existence and will stay clear of the region of water being used by the trotline fisherman using this invention.

SUMMARY OF THE INVENTION

The principal object of this invention is to provide a convenient means of supporting several fishing lines while each fishing line is supporting a multitude of fishing hooks, or turning blocks, or a combination of fishing hooks and turning blocks, or a combination of fishing hooks, turning blocks, and a live aquatic bait trap.

Another significant object of this invention provides a convenient means of gathering fish from the fishing hooks, turning blocks, or combination of fishing hooks and turning blocks and live aquatic bait trap using a windless to raise and lower the fishing lines from the body of water to a position over a landing pier, or boat, that is comfortable for the fisherman to remove the impaled fish from the fish hooks, turning blocks, or live aquatic bait from the bait trap.

While another object of this invention is to provide a more easily used method of raising and lowering the supporting structure into and up from the body of water by the use of an electric motor, or a fluid powered motor, driving the supporting structure about a pivotal axis that is attached to a land pier or boat.

Still another object of this invention is an improved method of securing a live minnow, or other live aquatic bait, to a standard fishing hook without being detrimental to the life of the live minnow, or other live aquatic bait.

Still another object of this invention is an improved method of securing a live worm fishing bait to a standard fishing hook without sacrificing the life of the worm, thereby providing a more effective use of the bait.

Another significant object of this invention is the use of a turning block equipped with multiple hooks, illuminating devices or paints to reflect the underwater lights, and vanes so fashioned as to cause rotation of the block when place in a body of water with sufficient current velocity.

Still another object of this invention is the use of the supporting structure to suspend a live bait trap below the surface of the body of water for the purpose of capturing live aquatic bait to be used for further trotline fishing, or for the sale of live aquatic bait.

Another object of this invention provides an assembly arrangement of plastic, or metal, components to construct the supporting structure.

A BRIEF DESCRIPTION OF THE DRAWINGS

FIG. 10 is a pictorial view showing one method of assembling the lower bar to the supporting framework.

FIG. 11 is a pictorial view of an intermediate section of one embodiment of the supporting framework of this invention.

FIG. 12 is a partial detail of the end fitting on the struts that support the trotline.

FIG. 13 is a plan view of a support base and a multiple line framework that is pivotally supported relative to the base.

FIG. 14 is a side elevational view of the device shown in FIG. 13.

FIG. 15 is a pictorial view of a portion of the framework this invention supporting an aquatic bait trap.

FIG. 16 is a pictorial view of one form of the turning block.

FIG. 17 is a plan view of FIG. 16.

FIG. 18 is a pictorial view of still another form the turning block may take.

FIG. 19 is a view of one more form that the turning block may take.

FIG. 20 illustrates still one more form that the turning block may take.

FIG. 21 is a pictorial view of a turning block 19 attached to the framework 1, and is submerged in a body of water with current sufficient to cause the turning block to rotate about its dorsal axis.

DESCRIPTION OF THE ILLUSTRATED EMBODIMENTS

This invention is particularly suited to a form of construction using pipe made of PVC (polyvinylchloride), aluminum, steel, or other types of material which possess mechanical and physical properties compatible with the functions of this invention. The supporting framework may be assembled into as many modular units as may be desired using industry standard pipe fittings of a compatible material.

Figure 1:
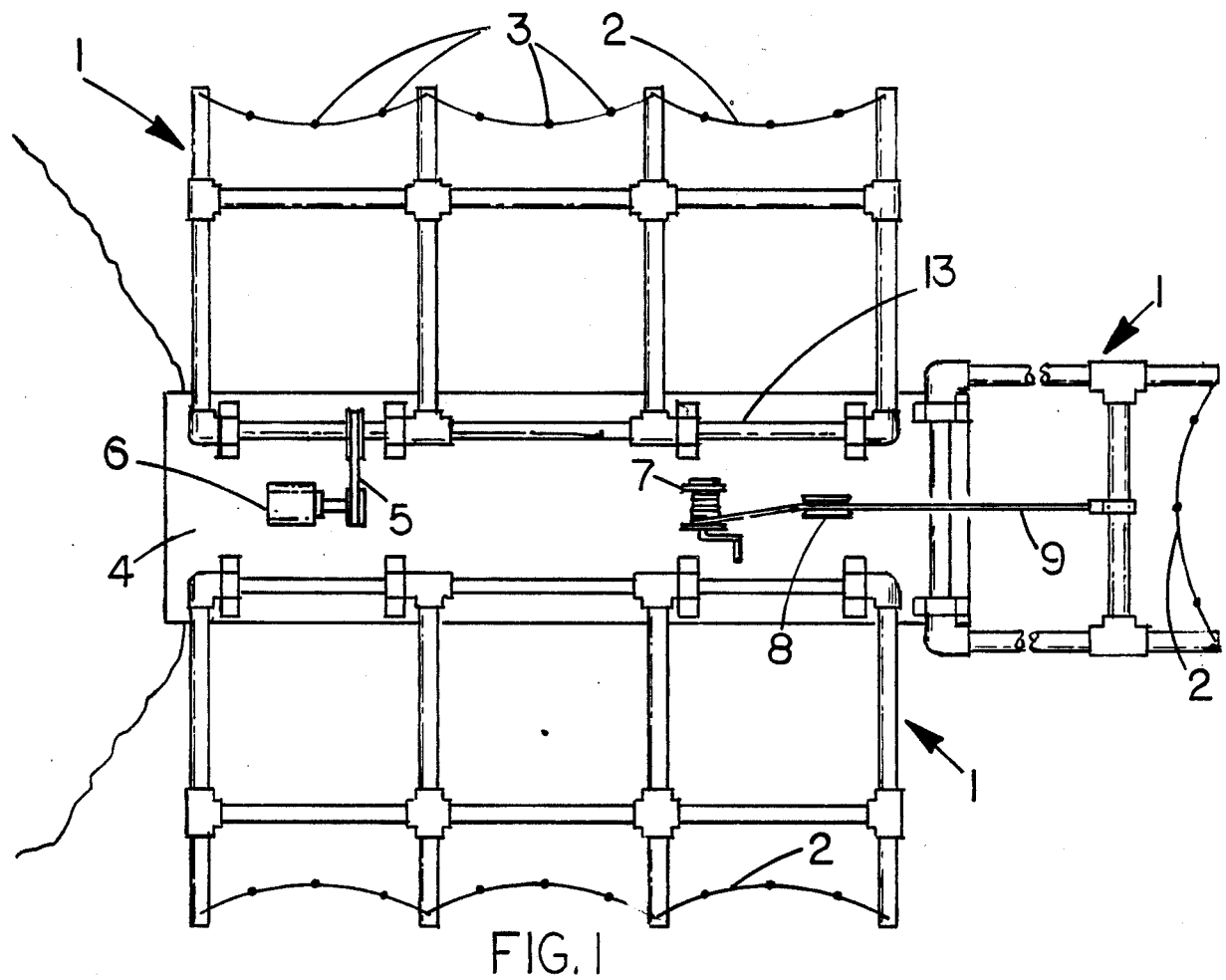
FIG. 1 is a plan view of an assembly of multiple trotline supports installed on another structure.
Figure 2:
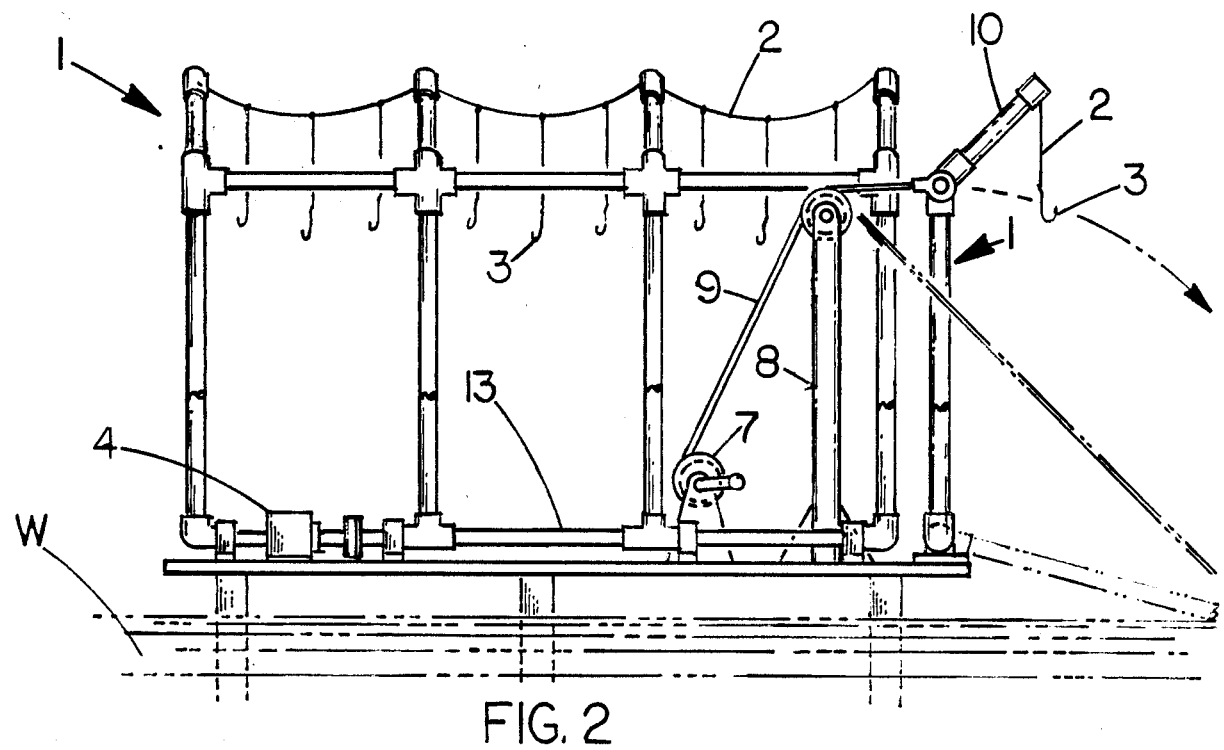
FIG. 2 is a side elevation view of the trotline support framework and a method of raising and lowering said framework to and from the water.

Referring to the characters of reference on the drawings, observe in FIG. 1 that this trotline supporting structure embodiment comprises a framework structure 1, a plurality of trotlines 2 attached to the framework 1, and multiple fishing hooks 3 attached to said trotlines. The framework structure 1, herein after referred to as "framework", is shown secured to a land pier or a boat 4 at several points and is pictured in modular form of construction. The framework 1 is fabricated from either threaded fittings and pipe or weld fittings and pipe. The framework 1 can also be fabricated from PVC (Polyvinylchloride) pipe and PVC (Polyvinylchloride) fittings that are threaded or "slip-on" types employing a solvent welding technique. The framework 1 can also be constructed employing any combination of the aforementioned methods for construction.

FIG. 10 illustrates the framework constructed such that a pipe 13 is used as a longeron secured to bearing blocks 11 that are rigidly attached to a land pier or boat. The tee fittings 12 are placed over the longeron 13 and are free to rotate easily about the dorsal axis of the longeron 13. The tee members are secured in their positions by the use of thrust washers 14 and the fasteners 15.

FIG. 11 illustrates a method of assembly at the intermediate joints of the framework that allows a rope or cable to be attached to the framework for the purpose of raising and lowering said framework by hand or using a windless manually or power driven with a suitable source of energy. The framework members 1 are joined to a six way tee 16 to form a rigid link. The rope or cable 9 is attached to the upper bail U1 of the six way tee 16 and the line 2 is fastened to the underside of the bail U2 and extends outwardly to a suitable length that is structurally compatible with the mechanical and physical properties of the material being used. The FIG. 12 portrays the mode used to secure the outermost line 2 to the framework. The cap 17 is permanently attached to the final strut 10, while the line 2 is tied to the outward bail U2 on the cap 17.

FIGS. 13-15 depicts another embodiment of this invention using a windless 7 mounted rigidly to said land pier or boat 4. A cordage 9 that is wrapped around the drum of the windless is threaded over an idler sheave assembly 8 and subsequently attached to the trotline support framework 1 as is shown in FIG. 14. The windless 7 is used to raise and lower the framework 1 as required to remove fish from the hooks 3 or placing bait on said hooks 3. Another embodiment for raising and lowering the trotline framework 1 is shown in FIG. 1 where a motor 6 is attached to the land pier or boat 4, and utilizes electrical or fluid power to drive a pulley set 5 which may in the alternative be a gear train or sprocket drive. This drive set is coupled to the longeron 13 of the framework 1 and causes the longeron 13 to rotate about its longitudinal axis allowing the trotline framework to be elevated or lowered.

Figure 3:
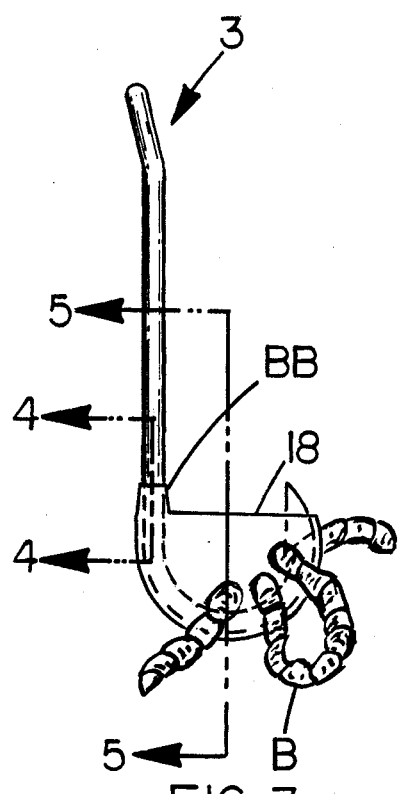
FIG. 3 is a side elevation view of a live worm secured to an improved fish hook construction used on a trotline.
Figure 4:
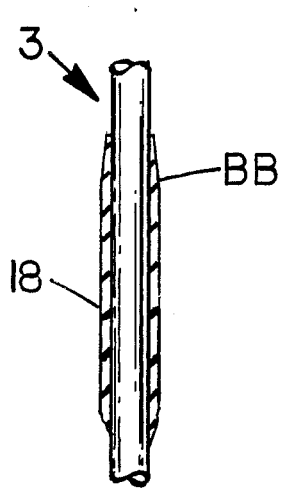
FIG. 4 is a section view along line 4—4 in FIG. 3.
Figure 5:
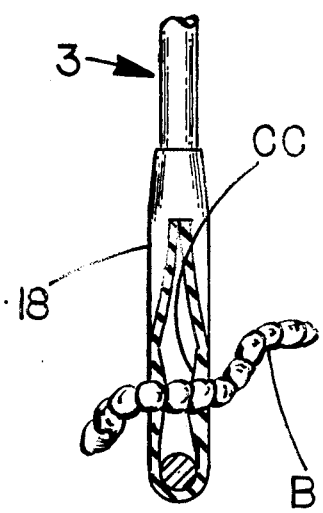
FIG. 5 is a section view along line 5—5 in FIG. 3.
Figure 6:
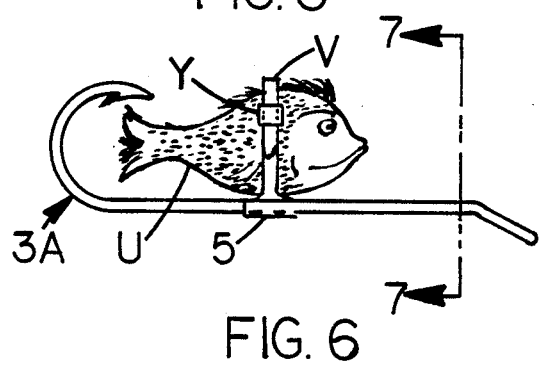
FIG. 6 is a side elevational view of a minnow uniquely secured to a standard barbed fish hook that may be utilized on the trotline of this invention.
Figure 7:
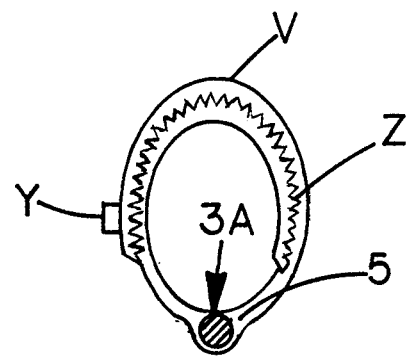
FIG. 7 is a section view along line 7—7 in FIG. 6.
Figure 8:
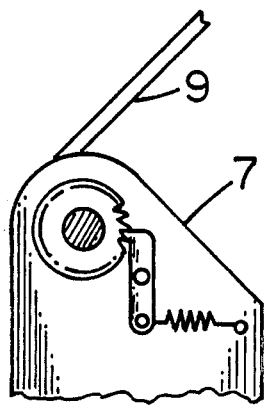
FIG. 8 is a view of the ratchet locking mechanism employed on the windless of this invention.
Figure 9:
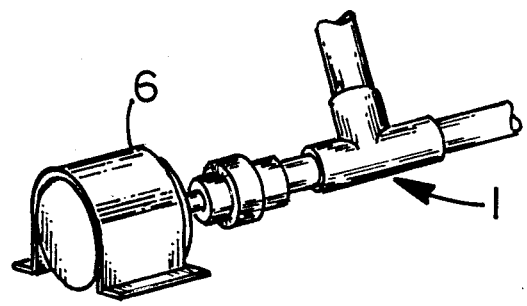
FIG. 9 is a pictorial view of a motor directly coupled to the framework 1.

FIGS. 3, 4, and 5 illustrate an embodiment used to attach a live worm bait B to an improved fish hook that is especially adapted for trotline use. The hook 3 uses a boot 24 that is made of surgical rubber or plastic material. The boot 24 illustrated in FIG. 3 is formed to include a cavity which fits intimately around the arcuate, barb, and the lower shank of the hook 3. A boss BB, pictured in FIG. 4, is formed with a hole that is smaller than the shank of the fish hook 3, and this boss is used to secure the boot to the fish hook 3. Three or more holes with inwardly protruding lips, defined in FIG. 5, are formed in the boot 24. These protrusions are formed through both walls of the cavity CC in the boot 24 and are so formed as to be smaller than the body of the worm bait B. These inwardly protruding lips collapse about the body segment of the worm and thus prevents the worm'S escape from the boot 24 while not doing injurious harm to the worm bait. Another significant embodiment of this invention is shown in FIG. 6. A live minnow or other aquatic bait U is strapped to an improved fishing hook 3 using belting V that is manufactured of surgical rubber, plastic or, a light brass material. The belt V is formed with internal serrations on one end, external mating serrations Z on the opposite end, a belt loop between them and, a snap in slot S that fits tightly about the shank of the hook 3 as is shown in FIGS. 6 and 7. A minnow U is attached to the hook 3 when the belting V is wrapped about the body of the minnow U, passed through the belt loop Y, the belting ends are then meshed into their serrations, and secured by sliding the belt loop V over the serrated portions of the belting V.

Still another embodiment of the invention is illustrated in FIG. 15, which is a partial view of the framework 1 shown supporting a live bait trap, which may be of a configuration chosen by the user of this invention.

FIG. 21 is a partial pictorial view of the framework 1 depicting another significant embodiment of this invention, a turning block 19 with particularly configured vanes that cause the block to rotate when the surfaces of said vanes are oblique to the direction of current flow and are impinged upon by said current. The helix angle and shape of the vanes will determine the rotational velocity of the turning block. The turning block 19 is attached to a spinning couple 20 that is attached to a fishing line 2 which is in turn attached to the framework 1. A weight 18A is an integral part of the spinning couple and is used for the purpose of positioning the turning block 19 below the surface of the water, and to prevent the line 2 from twisting and becoming tangled and fouled. Leader line 21 may be of a suitable metallic material and is secured to the aft end of the turning block 19, and does not rotate independently of said turning block. A second leader 22 of a nylon or suitable plastic material may be fastened to the metallic leader 21 while the opposite end is fastened to a unique fish hook 3 of this invention. There is no swivel couple between the leader line 21 and the aft end of the turning block 19 since it is desired to have the hook 3 rotate at the same angular velocity as the turning block 19 but not necessarily in the same rotational path. FIG. 16 is a top view of a form that can be used for the turning block. Each turning block is equipped with brightly colored reflecting sequins 23 at various positions about the turning block 19 for the purpose of reflecting light in random patterns as the turning block 19 rotates, submerged, in a stream of water with sufficient current velocity, or when the framework 1 is assembled to a boat or barge and the fishing lines 2 are pulled through the water by said boat or barge. The noise and series of random reflections generated by the turning block 19 will attract fish to the system for capture. FIGS. 16, 17, 18, 19, and 20 are illustrations of the various configurations that the turning block may take and still function properly.

From the foregoing description it will be readily seen that there has been produced a device which substantially fulfills the objects of the invention as set forth herein. The invention is not limited to the exemplary constructions herein shown and described but may be made in many ways within the scope and spirit of the appended claims.

What is claimed is:

1. In an apparatus for trotline fishing from a support base adjacent a body of water, the combination comprising:
    a. a framework supported from said base,
    b. a means on said base for raising and lowering said framework relative to said body of water.
    c. at least one trotline on said framework adapted to be lowered into said body of water for extended periods of time,
    d. a plurality of fishing hooks spaced along said trotline and containing fish bait thereon,
    e. and wherein said framework comprises multiple struts supported in said framework in a manner to rotate about a stationary axis of said framework.

2. In an apparatus for trotline fishing from a support base adjacent a body of water, the combination comprising:
    a. a framework supported from said base,
    b. a means on said base for raising and lowering said framework relative to said body of water,
    c. at least one trotline on said framework adapted to be lowered into said body of water for extended periods of time,
    d. a plurality of fishing hooks spaced along said trotline and containing fish bait thereon, and
    e. wherein said framework comprises stationary longerons rigidly supported from said base, and comprising tee members adapted to rotate about said longerons.

* * * * *